May 25, 1965    C. L. GARRISON    3,184,860
GAUGE
Filed May 22, 1962
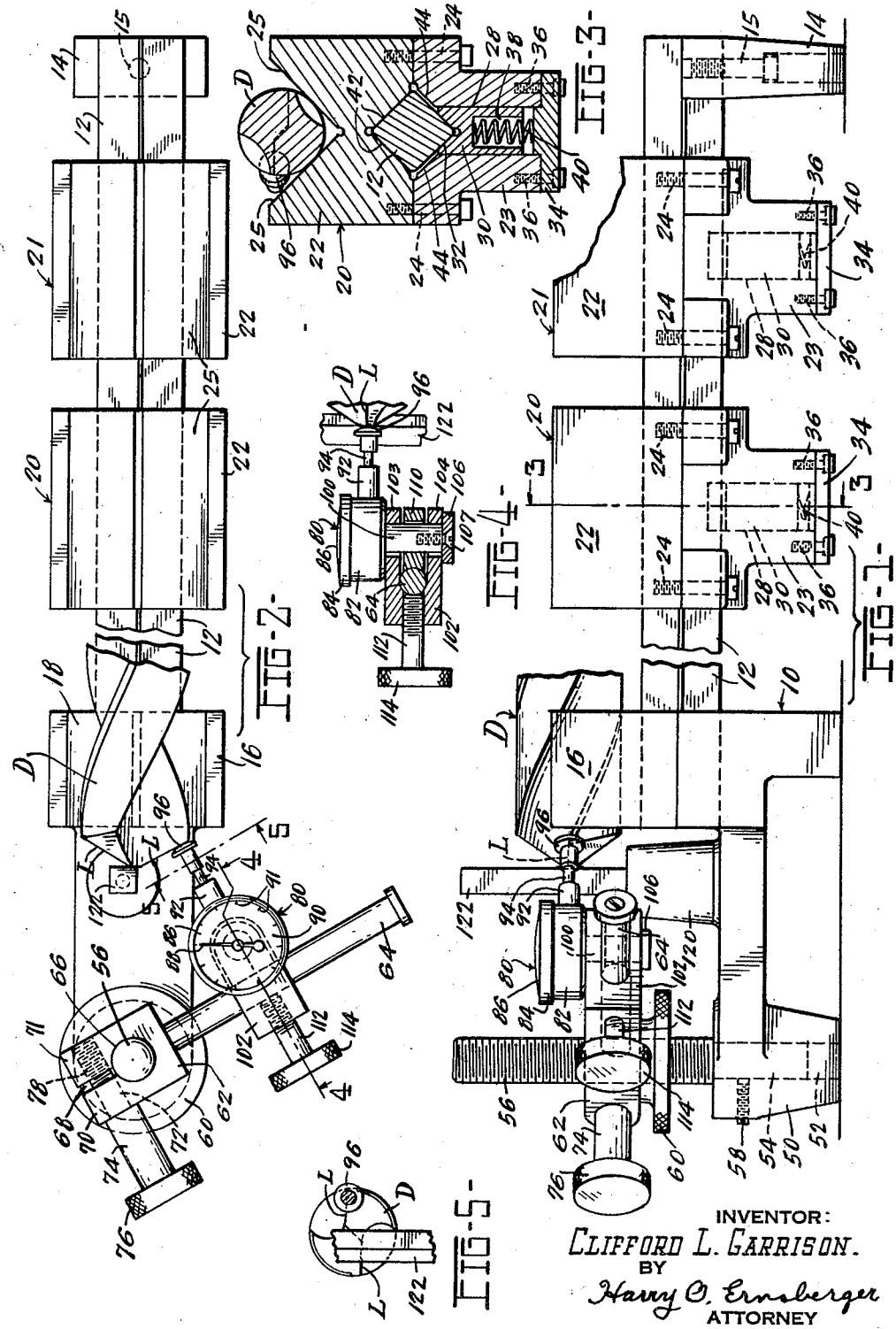
INVENTOR:
CLIFFORD L. GARRISON.
BY
Harry O. Ernsberger
ATTORNEY United States Patent Office 3,184,860
Patented May 25, 1965

1

3,184,860
GAUGE
Clifford L. Garrison, Adrian, Mich., assignor to Oliver Instrument Company, Adrian, Mich., a corporation of Michigan
Filed May 22, 1962, Ser. No. 196,651
5 Claims. (Cl. 33—201)

This invention relates to gauges for determining the accuracy of cutting lips of cutting tools and more especially to a gauge for determining the accuracy of the cutting lips or cutting edges of twist drills.

In the manufacture of fluted twist drills particularly of the larger sizes, the flutes are milled or machined in the drill rod or stock after which the fluted drill is hardened. In the hardening process, drills very often warp out of shape. The warping may bend the fluted drill so that it is not straight. The outside diameter of the drill is then ground, but the grinding operation, while truing up the outside diameter, does not affcet the fluted region of the drill. This condition may arise particularly with fluted drills which may be warped having two, three or four flutes wherein the flutes may not be of uniform dimension or properly spaced circumferentially or the spiral angularity or pitch of the flutes may vary so that in grinding or regrinding the cutting lips on the drill point, the lips may not be uniform because of the warped condition of the drill.

For a drill to function properly, the angles of the cutting edges or lips and the proper relation of the lips to the respective flutes in the drill must be identical. Otherwise the drill will form oversized apertures or apertures that are not truly round or cylindrical in form and, furthermore, the cutting speed of the drill may be impaired or retarded due to variations in the cutting angles or the length of the cutting edges whereby virtually only one lip is performing the drilling operations.

The present invention embraces the provision of a gauge or gauging means particularly for use in determining the proper characteristics of cutting lips or cutting edges of drills.

The invention has for an object the provision of a gauge for determining the accuracy of the cutting lips or cutting edges of fluted drills embodying a cradle means for properly supporting the drill during gauging operations and whereby gauging operations may be carried on in a minimum of time.

Another object of the invention resides in a gauge for determining the characteristics of cutting lips or edges of fluted twist drills wherein the gauging means is adjustably mounted for use in conducting gauging operations on twist drills of various lengths and diameters irrespective of the number of cutting lips or edges on the drill.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of the drill gauge of my invention;

FIGURE 2 is a top plan view of the gauge illustrated in FIGURE 1;

2

FIGURE 3 is a transverse vertical sectional view taken substantially on the line 3—3 of FIGURE 1;

FIGURE 4 is a detail sectional view taken substantially on the line 4—4 of FIGURE 2, and FIGURE 5 is a detail view taken substantially on the line 5—5 of FIGURE 2.

While the form of gauge of the invention illustrated in particularly adapted for use in determining the characteristics of cutting lips or cutting edges of a fluted twist drill having two flutes, it is to be understood that the gauge may be utilized for determining the characteristics of cutting edges of lips of drills having any number of flutes.

Referring to the drawings in detail, the gauge is inclusive of a base or frame comprising a head or head portion 10 to which is secured an elongated member or bar 12 and a rear supporting bracket or foot 14 secured to the bar 12 by a screw 15. The bar 12 may be of substantial length to accommodate drills of various lengths. In the gauge construction of the invention, the drill D to be tested is supported in V-shaped cradle means formed on the head portion 10 and provided by cradles or drill supporting means which may be adjusted lengthwise of the supporting bar or way 12 depending upon the length of the drill upon which testing operations are to be performed.

The head 10 is provided with an upwardly extending member or portion 16 secured to the head by screws (not shown), the upper region of which is formed with a V-shaped configuration or recess 18, the V-shape serving to properly support the drill. The bar 12 extends into an opening formed in the head 10 and is rigidly secured thereto. The bar 12 provides a support for adjustable cradles 20 and 21 which, in addition to the portion 16 on the head 10, serve to support other regions of a drill being tested in the gauge and properly center the drill with respect to an indicator. The cradles 20 and 21 are of identical construction and hence a description of one will suffice for both, a sectional view of the cradle 20 being illustrated in FIGURE 3.

The bar 12 is preferably of square cross-section as illustrated in FIGURE 3. Each cradle is provided with a drill engaging block 22 and a lower member 23, each block and member being secured together by screws 24. Each block 22 is fashioned with a V-shaped recess defined by convergently arranged surfaces 25, the surfaces adapted to support and properly position or center a drill D in the manner illustrated in FIGURE 3.

Each of the lower or depending members 23 is provided with a vertical bore 28 which snugly yet slidably accommodates a plunger 30. The plunger 30 is provided at its upper end with a V-shaped recess 32, the converging surfaces thereof engaging the lower converging surfaces of the bar 12 in the manner shown in FIGURE 3. The plunger 30 is preferably fashioned of bronze or other suitable material having long wearing characteristics as the cradles 20 and 21 are slidable along the bar 12. Secured to the lower end of each of the members or portions 23 of the cradles is a cap or abutment member 34 secured to portion 23 by means of screws 36.

The plunger 30 is provided with a bore 38 extending partially therethrough to receive an expansive coil spring 40 disposed between the bottom of the bore 38 and the upper surface of cap member 34 providing an abutment for the spring 40, the spring functioning at all times to bias the plunger 30 into engagement with the lower surfaces of the bar 12 in order to maintain the upper surfaces of the bar 12 in proper contact or engagement with the surfaces of the V-shaped recess 42 formed in the cradle blocks 22.

Thus through the provision of the spring biased plungers 30, the cradle blocks 22 are maintained in engagement with the bar 12 to thereby properly support the twist drill D.

As is shown in FIGURE 3, the upper portion of each depending member 23, adjacent the lower faces or surfaces of the bar 12, are provided with clearance spaces 44 so that the bar 12 is in engagement only with the converging surfaces 42 of the cradle structure and the V-shaped recess in the adjacent slidable plunger 30. Through this arrangement, the cradles 20 and 21 are always properly aligned on the bar 12 irrespective of the positions to which they may be adjusted by sliding the cradles lengthwise of the bar.

The indicating means of the gauge structure is supported by the head portion 10. The head portion 10 is provided with a boss 50 fashioned with a vertical bore 52 adapted to snugly receive a shank or tenon portion 54 of a threaded member 56. The tenon portion 54 is locked to the boss 50 by a setscrew 58. The member 56 provides a threaded post to facilitate vertical adjustment of the indicating means of the drill gauge. Threaded upon the post 56 is an adjusting nut 60 preferably having a knurled surface to facilitate gripping the nut to rotate the same.

An indicator support means of the invention is inclusive of a block or portion 62 to which is secured a transversely or horizontally extending bar or rod 64. The block 62 is fashioned with a bore 66 and a kerf 68 is formed in the block providing the leg portions 70 and 71 as particularly shown in FIGURE 2.

The leg portion 70 is drilled to accommodate a smooth surfaced tenon portion 72 of a clamping member 74, the latter having a knob or grip portion 76 preferably knurled to facilitate manipulation thereof. The leg portion 71 of the block 62 is provided with a threaded bore to receive a threaded portion 78 of the clamping member 74.

The clamping member 74 may be rotated to draw up the leg portions 70 and 71 of the block 62 toward each other to clamp the block onto the post 56. The bore 66 in the block 62 is unthreaded and when it is desired to adjust the relative vertical position of block 62, the clamp member 74 is rotated in a direction to release the legs 70 and 71 of the block 62 from clamping engagement with the post 56. The nut 60 is then adjusted to raise or lower the block 62, after which the clamp 74 may be rotated to draw the leg portions 70 and 71 into clamping engagement with the post 56.

The bar 64 is a component of the support means for an indicator 80. The indicator 80 is of conventional construction and includes a circular housing 82 provided with a cover means comprising an annular member 84 and a circular window 86 of glass or other transparent material. The indicating means includes an indicator hand or member 88 journaled upon a shaft concentric with the circular housing 82 whereby the indicator is rotatable within the housing. A dial 90 is provided with suitable graduations 91 indicating thousandths of inches or other suitable unit of measure.

Projecting laterally from the circular housing 82 is a hollow boss portion 92 in which is slidably supported a rod or member 94 equipped at its distal end with a drill engaging portion or button 96. The member or button 96 is adapted for engagement with the lips or cutting edges L of the twist drill D in the manner illustrated in FIGURE 2. The slidable or reciprocable rod 94 is arranged to rotate the indicating hand 88 through suitable rack and pinion mechanism of conventional character (not shown) contained in the housing 82.

Thus, the relative position of the button 96 when engaged with a lip L of a twist drill will result in the indicating hand 88 being moved to a particular position indicated by a graduation on the dial 90 in registry with the indicating hand. The means arranged to support the indicator 80 from the bar 64 is illustrated in detail in FIGURE 4. Secured to and depending from the circular casing 82 of the dial is a tenon or cylindrical portion 100.

A supporting block 102 is fashioned with a horizontal slot which form vertically spaced leg portions 103 and 104, each provided with an opening to receive the cylindrical member 100, the openings being of slightly larger diameter than that of the cylindrical portion 100 in order to provide for clamping the block 102 to the member 100. The block is retained in assembled relation with the portion 100 by means of a washer or member 106 fastened to the member 100 by a screw 107. Disposed between the leg portions 103 and 104 is a clamping block or member 110 which is fashioned with an opening to accommodate the cylindrical portion or member 100.

The bar 64 is received in the bight configuration in the block 102 provided by the base of the recess between the leg portions 103 and 104. The bar 64 is also engaged in a convace recess formed in the clamping block 110, the parts being arranged as illustrated in FIGURE 4. The block 102 is provided with a threaded bore to receive a threaded clamping screw 112 which is provided with a knurled knob 114 for manipulating the screw.

Through the arrangement shown in detail in FIGURE 4, it will be apparent that the indicator 80 may be adjusted lengthwise of the bar 64 by releasing the clamping screw 112 and sliding the bock 102 lengthwise of the bar 64. Before drawing up the screw 112, the indicator 80 may be revolved about the axis of the bar 64 to properly position the button 96 with respect to a lip of the drill. Thus it will be seen that the mounting means of the indicator 80 on the bar 64 provides for lengthwise and rotational adjustment of the indicator relative to the bar 64.

After the button 96 is brought into proper relation with a lip of a twist drill, the knob 114 may be rotated to draw the clamping screw 112 against the bar 64 which action securely clamps the cylindrical portion 100 of the indicator casing 82 to the block 102. It will also be seen that when the screw 112 is released, the cylindrical portion 100 of the housing 82 may be rotated about its axis.

The mounting arrangement provides for universal adjustment of the indicator with respect to the bar 64. The vertical relative position of the indicator 80 may be adjusted by manipulation of the nut 60 along the threaded post 56.

It will thus be apparent that the mounting means for the indicator is of such character that the indicator may be mounted in any position to accommodate various sizes of drill and to engage the indicator with any desired region of a cutting lip or a cutting edge of a twist drill. Means is provided for positioning each drill lengthwise of the gauge construction. The head member 10 is provided with an upwardly extending boss 120 which supports a gauge block or abutment 122 preferably of square cross-section as shown in FIGURE 2. The point of a drill is engaged with the abutment 122.

A typical gauging operation of a twist drill to determine the characteristics of the cutting lips or cutting edges L of the drill D is as follows: The fluted twist drill D is nested in the V-shaped recesses formed in the portion 16 of the head 10 and those provided in the cradles 20 and 21. The cradles 20 and 21 may be adjusted lengthwise of the bar 12 by sliding the cradles along the bar to provide proper support for the drill throughout it length.

The drill is then moved in a left-hand direction as viewed in FIGURES 1 and 2 until the apex or drill point formed at the convergence of the cutting lips is in engagement with a surface of the block or locating abutment 122.

The operator then adjusts position of the guage 80 as to height by rotating the nut 60 on the threaded post 56 to bring the indicator into genuerally horizontal position. The operator then manipulates the knob 76 of the clamping screw 74 and the knob 114 of the clamping screw 112 to adjust the relative position of the indicator 80 until the button 96 engages the lip L of the drill and the indication of the relative position of the button 96 noted on the dial 90.

The drill is then rotated to bring the next succeeding lip L thereof into engagement with the button 96. If the two cutting lips are in a proper relative position, there will be no relative movement of the indicator hand 88 thus indicating to the operator that the characteristics of the cutting lips L are identical. It is to be understood that the cutting lips of drills having two, three or four flutes and a like number of cutting edges or lips may be tested by the gauge arrangement of the invention. Through the provision of the several adjustments for the indicator of the gauge construction of the invention, the same is usable for gauging or testing various sizes and lengths of twist drills without the use of other accessories.

It is apparent that, within the scope of the invention, modifications and different arrangements may be made other than as herein disclosed, and the present disclosure is illustrative merely, the invention comprehending all variations thereof.

I claim:

1. A gauge construction particularly for determining the characteristics of the cutting lips of a fluted twist drill comprising, in combination, a frame including an elongated bar of noncircular cross-section, a drill supporting cradle mounted on said bar for slidable movement lengthwise of the bar, said cradle means including a V-shaped configuration adapted to receive and support a twist drill, abutment means mounted by the frame arranged for engagement with a twist drill to position the latter with respect to the frame, indicating means having a movable component arranged for engagement with a cutting lip of a drill supported in the cradle means, mounting means for the indicator, said mounting means including a vertical post, a block arranged to be supported by the post, a rod extending transversely from the block, an element carried by said rod, a slot formed in said element providing spaced leg portions, a clamping member disposed between said leg portions, a tenon portion provided on the indicator, said leg portions and said clamping member having openings to accommodate the tenon on said indicator, a manipulating screw arranged to clamp the tenon on the indicator to said member and to clamp said member on the rod, and means arranged to adjust the vertical position of said block with respect to said frame.

2. Gauge construction for use with twist drills, in combination, a support including a head portion and an elongated bar portion, said head portion having a V-shaped recess to support the forward portion of a twist drill, said bar portion being of substantially square cross section, cradle means mounted on said bar adapted to support an intermediate portion of a twist drill, abutment means carried by the head portion for positioning the drill lengthwise of the support, said cradle means including a block having a first V-shaped recess to receive the drill, said block being formed with a second V-shaped recess engaging a pair of converging surfaces of the bar portion, a member slidably mounted on said cradle means having a recess for engagement with another pair of converging surfaces of said bar portion, resilient means biasing said slidable member into engagement with the pair of surfaces of the bar portion, said cradle means being slidable lengthwise of the bar portion, an indicator having a relatively movable element adapted to be engaged with a lip of the twist drill, mounting means for the indicator carried by the support including a member arranged for vertical adjustment relative to the support, and adjustable means carried by said member and connected with the indicator providing for universal adjustment of the indicator relative to a drill mounted in the cradle means.

3. A drill gauge construction comprising, in combination, a support having a head portion and an elongated bar portion, said head portion having a V-shaped recess for accommodating a drill to be tested, said bar portion being of a cross sectional shape providing pairs of converging surfaces, relatively movable means mounted by the bar portion providing additional support for a twist drill, said relatively movable means including a block having a V-shaped recess to accommodate the drill and a second V-shaped recess accommodating one pair of converging surfaces of the bar portion, said relatively movable means being slidable along the bar portion, a member carried by the block having a passage therein, a plunger slidably mounted in the passage, said plunger having a V-shaped configuration, resilient means engaging the plunger and biasing the plunger to engage the V-shaped configuration with another pair of converging surfaces on the bar portion, an indicator having a relatively movable component arranged to engage a lip of a twist drill, means mounted by the head portion supporting the indicator, said indicator supporting means including a universally adjustable mounting means whereby the position of the indicator may be adjusted for use with drills of various sizes and having cutting edges of various angles.

4. A drill gauge including, in combination, a support having a head portion and an elongated bar portion, said head portion having a V-shaped recess for supporting the forward portion of a drill to be tested, means slidably mounted on the bar portion providing additional support for the twist drill, said bar portion being of a cross section providing pairs of converging surfaces, said slidably mounted drill supporting means including a block formed with a V-shaped recess to accommodate a twist drill, said block having a second V-shaped recess engaging a pair of converging surfaces of said bar portion, a member secured to said block, relatively movable means carried by said member having a V-shaped recess engagable with a second pair of converging surfaces of said bar portion, resilient means biasing said relatively movable means into frictional engagement with the bar portion to maintain the pair of converging surfaces of the bar portion and the block in engagement, and an indicator having a relatively movable component arranged for engagement with a lip of a twist drill, and adjustable means supporting the indicator whereby the movable component of the indicator is adapted for engagement with lips of drills of various sizes.

5. A gauge construction for determining the characteristics of the cutting lips of a fluted twist drill comprising, in combination, a frame including an elongated bar of a cross section providing pairs of converging surfaces, said frame having a V-shaped portion adapted to accommodate and support the forward portion of a drill to be tested, a drill supporting cradle means mounted for slidable movement on said bar, said cradle means including a first V-shaped configuration adapted to support a twist drill, said cradle means including a second V-shaped configuration adapted to engage one pair of converging surfaces of the elongated bar, a plunger slidably mounted on the cradle means and having a V-shaped configuration abutment means arranged for engagement with the point of a twist drill to position the latter with respect to the frame, resilient means biasing the plunger to engage the V-shaped configuration thereof with another pair of converging surfaces of the bar to maintain the cradle means in engagement with the bar, indicating means having a movable component arranged for engagement with a cutting lip of a drill supported in the V-shaped configuration of the frame and the V-shaped configuration of the cradle means, mounting means for the indicator, said mounting means including a vertically adjustable member, a rod extending transversely from the member, an element carried by said rod, a slot formed in said element providing spaced leg portions, a clamping member disposed between said leg portions, a projection provided on the indicator, said leg portions and said clamping member having openings to accommodate the projection on said indicator; and a manipulating means arranged to clamp the projection to said member and to clamp said member on the rod.

References Cited by the Examiner

UNITED STATES PATENTS

| | | | |
|---|---|---|---|
| 1,179,551 | 4/16 | Muller | 33—75 X |
| 1,917,926 | 7/33 | Decker | 308—3 |
| 2,110,087 | 3/38 | Kuhn | 33—80 X |
| 2,124,006 | 7/38 | Parker | 33—172 X |
| 2,337,819 | 12/43 | Hofmann | 33—201 |
| 2,375,448 | 5/45 | Talbot et al. | 33—170 X |
| 2,456,003 | 12/48 | Knutson | 33—172 X |
| 2,577,228 | 12/51 | Carlson | 33—201 |
| 3,101,550 | 8/63 | Helferich | 33—143 |

FOREIGN PATENTS 1,235,091   5/60   France.

ISAAC LISANN, *Primary Examiner.*